(12) United States Patent
Smith et al.

(10) Patent No.: US 7,139,801 B2
(45) Date of Patent: Nov. 21, 2006

(54) SYSTEMS AND METHODS FOR MONITORING EVENTS ASSOCIATED WITH TRANSMITTED ELECTRONIC MAIL MESSAGES

(75) Inventors: Steve Smith, San Francisco, CA (US); Douglas P. Rayner, San Francisco, CA (US)

(73) Assignee: MindShare Design, Inc., San Francisco, CA (US)

(*) Notice: Subject to any disclaimer, the term of this patent is extended or adjusted under 35 U.S.C. 154(b) by 631 days.

(21) Appl. No.: 10/171,720

(22) Filed: Jun. 14, 2002

(65) Prior Publication Data

US 2003/0233412 A1 Dec. 18, 2003

(51) Int. Cl.
G06F 15/16 (2006.01)

(52) U.S. Cl. .................. 709/206; 709/203; 709/247; 709/246

(58) Field of Classification Search ............. 709/203, 709/206, 246, 247; 707/3
See application file for complete search history.

(56) References Cited

U.S. PATENT DOCUMENTS

| | | | |
|---|---|---|---|
| 4,723,212 A | 2/1988 | Mindrum et al. | |
| 5,377,354 A | 12/1994 | Scannell et al. | |
| 5,424,724 A | 6/1995 | Williams et al. | |
| 5,487,100 A | 1/1996 | Kane | |
| 5,502,636 A | 3/1996 | Clarke | |
| 5,504,897 A | 4/1996 | Gans et al. | |
| 5,619,648 A | 4/1997 | Canale et al. | |
| 5,740,549 A | 4/1998 | Reilly et al. | |
| 5,761,662 A | 6/1998 | Dasan | |
| 5,793,497 A | 8/1998 | Funk | |
| 5,793,972 A | 8/1998 | Shane | |
| 5,819,261 A * | 10/1998 | Takahashi et al. | 707/3 |
| 5,835,762 A | 11/1998 | Gans et al. | |
| 5,862,325 A | 1/1999 | Reed et al. | |
| 5,864,684 A | 1/1999 | Nielsen | |
| 5,893,099 A | 4/1999 | Schreiber et al. | |
| 5,903,723 A | 5/1999 | Beck et al. | |
| 5,919,247 A | 7/1999 | Van Hoff et al. | |
| 5,930,479 A | 7/1999 | Hall | |
| 5,937,162 A | 8/1999 | Funk et al. | |
| 5,944,787 A | 8/1999 | Zoken | |

(Continued)

OTHER PUBLICATIONS

Article—"FloNetwork Inc., Prefer Network Team Up," www.emailuniverse.com/list-news/2000/10/18.html, Oct. 18, 2000, 1 page.

(Continued)

*Primary Examiner*—Rupal Dharia
*Assistant Examiner*—Djenane M. Bayard
(74) *Attorney, Agent, or Firm*—Fliesier Meyer LLP

(57) ABSTRACT

Various systems and methods provide users with the ability to track, detect, record analyze and report various events associated with the life of an electronic mail message delivered to any recipient. Some of the events that may be tracked by the systems and methods of the preferred exemplary embodiment include identification of when a recipient views a message and clicks on any web page links contained within the message. In accordance with another aspect of the preferred exemplary embodiment of the present invention, the systems and methods provide a simple mechanism for storing, monitoring and accessing information relating to various events that have transpired with respect to a large volume of electronic mail messages. Electronic mail message list may also be automatically generated with the data acquired by the systems and methods of the present invention.

1 Claim, 2 Drawing Sheets

U.S. PATENT DOCUMENTS

| | | | |
|---|---|---|---|
| 5,948,061 A | 9/1999 | Merriman et al. |
| 5,970,469 A | 10/1999 | Scroggie et al. |
| 5,990,886 A | 11/1999 | Serdy et al. |
| 5,999,932 A | 12/1999 | Paul |
| 5,999,967 A | 12/1999 | Sundsted |
| 6,014,634 A | 1/2000 | Scroggie et al. |
| 6,023,723 A | 2/2000 | McCormick et al. |
| 6,038,668 A | 3/2000 | Chipman et al. |
| 6,044,205 A | 3/2000 | Reed et al. |
| 6,044,395 A | 3/2000 | Costales et al. |
| 6,052,709 A | 4/2000 | Paul |
| 6,072,942 A | 6/2000 | Stockwell et al. |
| 6,112,227 A | 8/2000 | Heiner |
| 6,138,162 A | 10/2000 | Pistriotto et al. |
| 6,161,130 A | 12/2000 | Horvitz et al. |
| 6,167,435 A | 12/2000 | Druckenmiller et al. |
| 6,173,311 B1 | 1/2001 | Hassett et al. |
| 6,185,541 B1 | 2/2001 | Scroggie et al. |
| 6,195,698 B1 | 2/2001 | Lillibridge et al. |
| 6,199,102 B1 | 3/2001 | Cobb |
| 6,216,127 B1 | 4/2001 | Gans et al. |
| 6,226,684 B1 | 5/2001 | Sung et al. |
| 6,249,805 B1 | 6/2001 | Fleming, III |
| 6,266,692 B1 | 7/2001 | Greenstein |
| 6,272,536 B1 | 8/2001 | Van Hoff et al. |
| 6,289,372 B1 | 9/2001 | Vyaznikov |
| 6,341,316 B1 | 1/2002 | Kloba et al. |
| 6,353,852 B1 | 3/2002 | Nestoriak et al. |
| 6,367,075 B1 | 4/2002 | Kruger |
| 6,377,936 B1 | 4/2002 | Henrick et al. |
| 6,381,631 B1 | 4/2002 | Van Hoff |
| 6,393,464 B1 | 5/2002 | Dieterman |
| 6,421,709 B1 | 7/2002 | McCormick et al. |
| 6,421,717 B1 | 7/2002 | Kloba et al. |
| 6,430,608 B1 | 8/2002 | Shaio |
| 6,463,462 B1 | 10/2002 | Smith et al. |
| 6,546,416 B1 | 4/2003 | Kirsch |
| 6,553,412 B1 | 4/2003 | Kloba et al. |
| 2001/0051979 A1 | 12/2001 | Aufricht et al. |
| 2002/0023135 A1 | 2/2002 | Shuster |
| 2002/0032722 A1 | 3/2002 | Baynes et al. |
| 2002/0052781 A1 | 5/2002 | Aufricht et al. |
| 2002/0116463 A1 | 8/2002 | Hart |
| 2002/0120496 A1 | 8/2002 | Scroggie et al. |
| 2002/0143879 A1 | 10/2002 | Sommerer |
| 2002/0152245 A1 | 10/2002 | McCaskey et al. |
| 2002/0152272 A1 | 10/2002 | Yairi |
| 2002/0199095 A1 | 12/2002 | Bandini et al. |
| 2003/0014414 A1 | 1/2003 | Newman |
| 2003/0028580 A1 | 2/2003 | Kucherawy |
| 2004/0205133 A1* | 10/2004 | Adler ..................... 709/206 |

OTHER PUBLICATIONS

Press Release—"Responsys.com Introduces Responsys Interact 2.0 for Permission-Based Direction on the Internet," www.responsys.com/corporate/about/details_press.asp?id=10, dated Monday, Oct. 25, 1999, 3 pages.

Press Release—"L-Soft Announces Release of LSMTP™ Version 1.1b," www.1soft.com/news/lsmtp, dated Mar. 1, 1992, 2 pages.

Internet Article—"Eight Great Lists Call Topica Home," *The Leader in Email Discussions & Publishing Solutions*, www.topica.com/about/index.html?mode=eight, dated Jul. 26, 1999, 3 pages.

Chapman, D. B., "Majordomo: How I Manage 17 Mailing Lists Without Answering "request" Mail," *1992 LISA VI*, Oct. 19-23, 1992—Long Beach, CA, pp. 135-143.

* cited by examiner

SYSTEMS AND METHODS FOR MONITORING EVENTS ASSOCIATED WITH TRANSMITTED ELECTRONIC MAIL MESSAGES

BACKGROUND OF THE INVENTION

1. Field of the Invention

The present invention relates generally to the field of automated electronic communications systems. More specifically, the present invention is directed to systems and methods for electronically monitoring events associated with the transmission of electronic mail messages as well as the storage of information that is generated pertaining to the monitoring of various events in the life of an electronic mail message. Specifically, in accordance with the preferred exemplary embodiment, the systems and methods of the present invention may be utilized to provide tracking information pertaining to the access and utilization of electronic mail messages and includes sophisticated techniques for automatically storing this information. Additionally, the systems and methods disclosed herein may be utilized for the purpose of generating electronic mail message lists.

2. Description of the Related Art

Electronic mail messaging has grown dramatically with the corresponding increase in usage and access to computer systems. Electronic mail is now recognized as a simple and convenient means for communicating information and is now widely used in the business world as well as for communicating personal information. It is also widely used in the marketing industry for transmitting advertising information.

Conventional electronic mail messaging systems provide the ability to monitor certain events associated with messages that have been transmitted. The use of so-called "clickthrough" tracking provides the ability to determine when recipients have accessed a message and some systems also provide the ability to ascertain when other events take place such as the opening of a message. One of the shortcomings of these existing electronic mail systems is that the existing systems utilize cumbersome and computationally expensive techniques for storing information relating to what happens with a message once it has been transmitted from an electronic mail server to a recipient.

The amount of information that can be generated regarding access and other events associated with electronic mail messages is extremely large especially for high volume electronic mail messaging systems. The industry has recognized increasing demand for this information as it has been found to be particularly useful in the advertising industry. There are also numerous other applications in other fields as well for this technology. Historically, there has been no convenient, economical and reliable mechanism for receiving and archiving information relating to the monitoring of events associated with an electronic mail message once the message has been transmitted from a mail server.

In existing systems, users are able to receive information regarding when a user initially receives a message and when a recipient accesses a message. For example, Microsoft Outlook is one electronic mail platform that provides this functionality. In this program, a user is able to request a return receipt to indicate when a recipient has received a particular message. As noted above, other additional information is also available concerning other events associated with the message.

There is currently no system available for economically storing large quantities of information in a convenient format pertaining to events that are associated with a large number of electronic mail messages. Furthermore, there is currently no system available for automatically transferring this information into an archive automatically in a quick and convenient manner. These are especially difficult tasks due to the tremendous volume of electronic mail messages that are transmitted from certain systems. The existing systems that are available for storing this information require tremendous amounts of processing time and resources in order to tabulate information and provide reports and tracking information. Accordingly, in order to provide this service, there is a significant expense associated with providing this type of information, especially for systems that handle large lists or provide complex reports.

There is also a need for providing easy access to this information so that electronic mail message lists may be automatically generated. In adopting electronic mail as a mode of communication for retailers, there have been several problems. The manual collection of electronic mail addresses for customers is inefficient, prone to errors and results in the capture of only a small portion of the electronic mail addresses for the customers of a particular store.

In light of these and other shortcomings, the inventors have proposed new systems and methods that provide a variety of techniques for monitoring various events associated with electronic mail messages. The innovations are directed to high volume electronic mail message transmission systems and the storage of information that is derived from monitoring various events in the life of a electronic mail messages. Those skilled in the art will appreciate that the storage techniques and innovations disclosed herein may be useful in other applications as well.

Some of the preferred exemplary embodiments of the systems and methods of the present invention are particularly well suited for monitoring and maintaining information relating to access and utilization of electronic messages that are transmitted through high-volume electronic mail messaging systems. Yet additional alternate preferred exemplary embodiments provide systems and methods for automatically generating electronic mail messaging lists that are derived from the access and utilization information generated through the electronic mail monitoring innovations of the present invention.

SUMMARY OF THE INVENTION

The preferred exemplary embodiment of the present invention provides a variety of systems and methods for monitoring various events associated with electronic mail messages and includes innovations directed to the storage of this information. In accordance with a first preferred exemplary embodiment of the present invention, the systems and methods described herein provide system operators with the ability to track, detect, record, analyze and report various events associated with the life of an electronic mail message delivered to any recipient. Some of the events that may be tracked by the systems and methods of the preferred exemplary embodiments including identification of when a recipient views a message and clicks on any web page links contained within the message. In accordance with another aspect of the preferred exemplary embodiment of the present invention, the systems and methods provide a simple mechanism for storing, monitoring and accessing information relating to various events that have transpired with respect to a large volume of electronic mail messages. The information storage techniques of the present invention are significantly more efficient and economical as compared with the prior art solutions and techniques for the storage of this information.

In accordance with the first preferred exemplary embodiment, transmitted electronic mail messages include a unique identifier element that is used to index into a bitmap representing information pertaining to a large volume of electronic mail messages. Those skilled in the art will appreciate that it is not necessary to utilize a bitmap for accumulating relevant data and that other alternate storage techniques may be utilized as well. The bitmap technique is preferred due to the fact that a very small volume of space is required for storage of a large volume of information. Furthermore, the techniques for archiving information pertaining to a message can be implemented automatically in a very efficient manner as described below. This storage technique of the preferred exemplary embodiment is particularly suitable for storage of information pertaining to a very high volume electronic mail messaging system.

In the preferred exemplary embodiment, positive integer values are utilized for interaction with the bitmap. The bitmap techniques provide extremely dense storage of information although it is not necessary to utilize each of the individual bits in the bitmap. In accordance with an alternate exemplary embodiment, a globally unique identifier is utilized. The globally unique identifier may be a combination of unique identifiers that uniquely identify an object or event. Alternatively, the globally unique identifier may be an exclusive reference identifier. In the preferred exemplary embodiment, the globally unique identifier or unique identifier is simply a digitized value or code number that can be correlated with certain information concerning the message such as, the identification of the recipient, message list, or other desired information.

In the preferred exemplary embodiment, as noted above, a bitmap is utilized for the purpose of acquiring and maintaining electronic mail tracking information. Individual bitmaps may be associated with a single event. In the preferred exemplary embodiment, a sequence of binary data bits is utilized. Locations for the data bits or an array of locations may be addressed using the unique identifier referenced above. In the preferred exemplary embodiment, a high logic level for a data bit indicates that a particular action has taken place. Those skilled in the art will appreciate that the selection of the logic level for identifying and an event with a particular data bit is a matter of design choice.

The use of the response server for recording events associated with a recipient reading a message is known as open tracking. As noted above, the globally unique identifier may include a unique identifier for a particular message list, message and/or recipient. The act of opening/reading a message automatically generates an event in the response server.

In the first preferred exemplary embodiment, the footer of an HTML electronic mail message references an image with a unique identifier or globally unique identifier. As noted above, the globally unique identifier may also include a unique identifier for a particular message list, message and/or recipient. The act of opening the message references the image that then generates an event in a response server.

In accordance with the preferred exemplary embodiment, when this occurs, the image request is initially automatically routed to a response server that receives the identifier information and thereafter automatically returns the requested image. The globally unique identifier information is decoded via the response server to determine the particular electronic mail message list, or message recipient. The event associated with the list and/or message is then recorded and archived. The information is particularly useful for generating large volumes of data pertaining to electronic mail messages in a compact and convenient format.

The use of the response server for recording events associated with a recipient clicking on a link in a message is known as click-through tracking. As noted above, the globally unique identifier may include a unique identifier for a particular message list, message, link and/or recipient. The act of clicking on the link automatically generates an event in the response server and the user is forwarded to the ultimate destination.

In the first preferred exemplary embodiment, the links in the original message are replaced with links that reference the response server and include a unique identifier or globally unique identifier. As noted above, the globally unique identifier may also include a unique identifier for a particular message list, message and/or recipient. The act of clicking on a link in the message generates an event in a response server.

In accordance with the preferred exemplary embodiment, when this occurs, the user is initially automatically routed to a response server that receives the identifier information. The globally unique identifier information is decoded via the response server to determine the particular electronic mail message list, original link, and message recipient. The user is thereafter automatically routed to the location of the original link. The event associated with the list and/or message is then recorded and archived. The information is particularly useful for generating large volumes of data pertaining to electronic mail messages in a compact and convenient format.

In the preferred exemplary embodiment, a bitmap is utilized to track events, for example, which recipients have opened a particular message. The bitmap is conveniently updated by the logical "or" of the recipient unique identifier that designates a unique position in the bitmap for storage of this information. For example, if recipient No. 100 has opened a message, address or location 100 in the bitmap changes to logic level 1 through this logical operation. As a result, it is very easy to acquire and maintain tracking information for a large group of messages. The total recipient and unique recipient counts are maintained and reported as desired. The bitmap information may then be utilized to identify individual recipients who have opened a particular message. Additionally, the bitmap provides a very convenient mechanism for readily generating statistical information concerning various messages.

One additional feature and advantage of the bitmap techniques described above is that they provide inherent compression advantages over the prior art techniques. For example, the bitmap can be essentially dynamically allocated depending on recipient information. The physical size of the bitmap need only be as large as the highest number address for which unique identifier information has been received. For example, if there are one million recipients for a message, and only unique identifier address designation 10 has been received, then the bitmap size need only be sufficiently large enough to make this designation. The bitmap does not have to be sized to accommodate each of the one million recipients initially.

As another feature an advantage of the present invention and in recognition of the space-saving aspects described above, in accordance with an alternate exemplary embodiment, if the bitmap is less than 1000 bits in size, then the unique identifiers are simply stored. Furthermore, if a bitmap is old or otherwise seldom accessed, then further compression techniques may also be utilized for realizing additional benefits from the elimination of storage requirements. As described below, the systems and methods provide dynamic modification of bitmap update frequency in order to optimize the utilization of delivery resources and processing.

Yet an additional advantage of the present invention is the inherent performance gains that are achieved through the use of logical operations for storage of the data which is conveniently handled by system processors. For example, a processor that has a 32-bit architecture may be able to process 32 simultaneous logical "or" operations in a single clock cycle as compared with one or more cycles required for other more conventional stores techniques.

In accordance with a further alternate exemplary embodiment of the present invention, information pertaining to various actions associated with an electronic mail message is utilized to automatically generate focused electronic mail message lists. In this alternate exemplary embodiment, the unique identifier information or globally unique identifier information is utilized to provide a cross-reference with the recipient's electronic mail address. Lists can automatically be generated through utilization of the unique identifier information with the response server.

Other objects and advantages of the present invention will become apparent in light of the following detailed description of the presently preferred embodiments when considered in light of the drawings.

DETAILED DESCRIPTION OF THE PRESENTLY PREFERRED EMBODIMENTS

Figure 1:
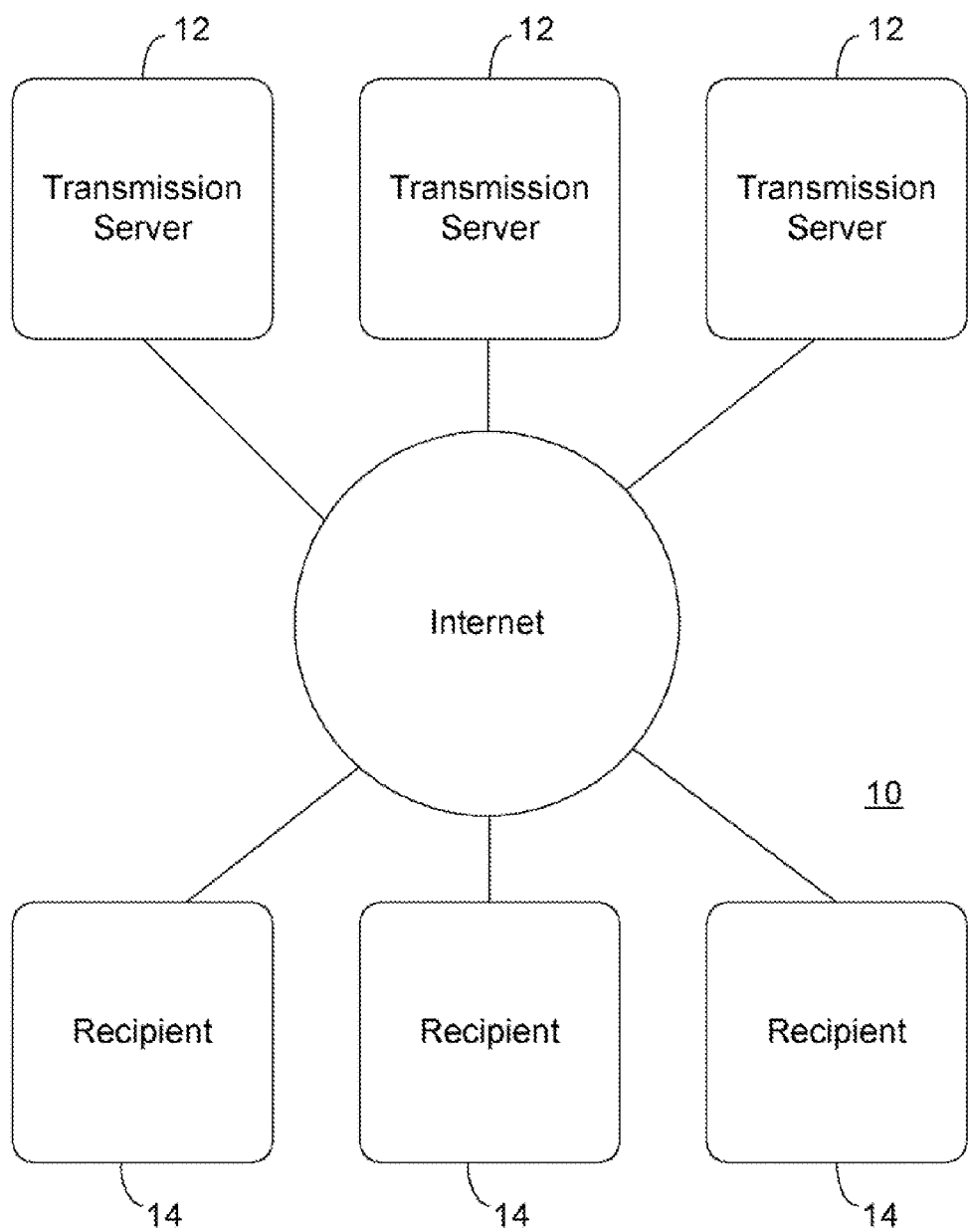
FIG. 1 illustrates the first preferred exemplary embodiment of the present invention.

FIG. 1 illustrates a first exemplary embodiment of the present invention that is shown generally at 10. In accordance with the first preferred exemplary embodiment of the present invention, a plurality of electronic mail transmission servers 12 each transmits messages from one or more electronic mail message lists to a plurality of recipients through the Internet. In the preferred exemplary embodiment, each of the electronic mail messages that are transmitted via the electronic mail transmission servers 12 include a unique identifier or globally unique identifier that accompanies the message. The unique identifier or globally only unique identifier is preferably a unique binary number or code that is embedded in each link in the message as well as in the footer of an HTML message. Those skilled in the art will appreciate that it is not necessary to include the unique identifier or globally unique identifier in every message. It will be recognized that this technique need only be used as desired in order to accumulate relevant information.

Figure 2:
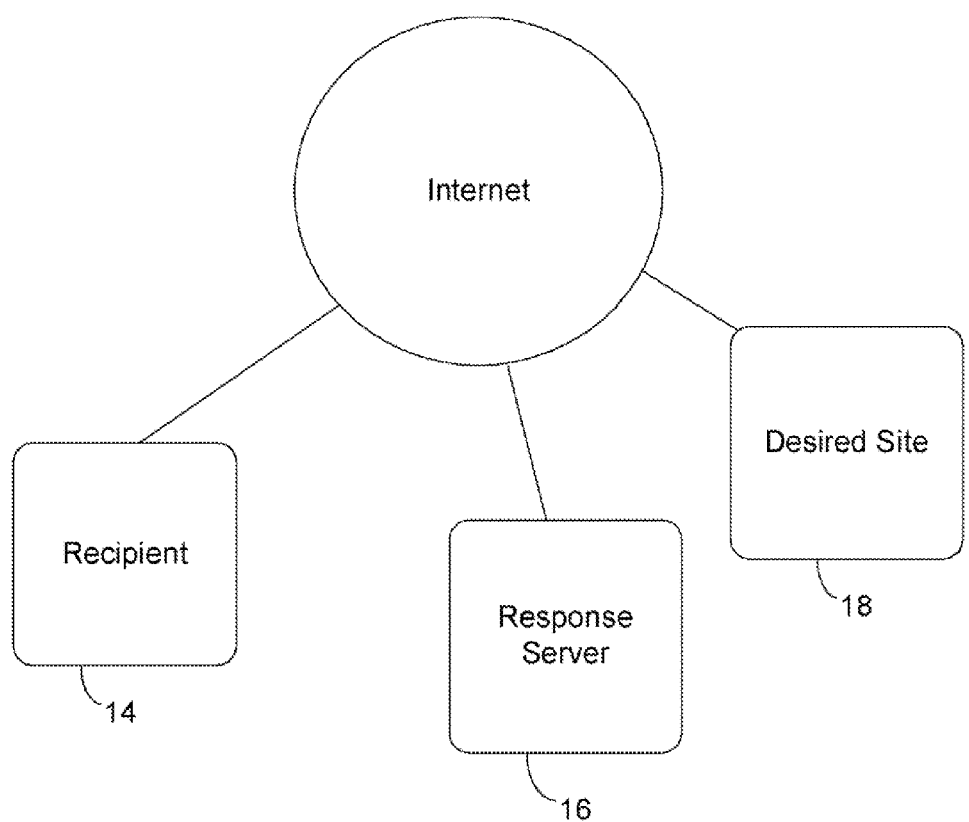
FIG. 2 illustrates interaction of a response server in accordance with an exemplary embodiment of the present invention.

The electronic mail messages are transferred through the Internet to a plurality of individual recipients 14. When the recipients open the message or a particular link contained in the message in order to access a particular link, the link initially routes the user or recipient to an intermediate response server that then forwards the user to the desired link. FIG. 2 illustrates recipient interaction with a response server. As shown in FIG. 2, a recipient 14 seeks to access a particular link by clicking on the link. When the user clicks on the link, initially the user is routed to a response server 16. The response server 16 automatically routes the user to the desired site 18. When the user generates a link to the response server by clicking on a desired link, the response server 16 forwards the user to the desired site and also identifies the unique identifier code or globally unique identifier code embedded within link code. The response server then compiles this information.

The systems and methods described herein provides users with the ability to track, detect, record, analyze and report various events associated with the life of an electronic mail message delivered to any recipient. Some of the events that may be tracked by the systems and methods of the preferred exemplary embodiment include identification of when a recipient views a message and clicks on any web page links contained within the message.

The globally unique identifier information is decoded via the response server to determine the particular electronic mail message list, or message recipient. The event associated with the list and/or message is then recorded and archived. The information is particularly useful for generating large volumes of data pertaining to electronic mail messages in a compact and convenient format.

In accordance with the preferred exemplary embodiment, for the sake of convenience, and in order to limit the amount of storage space required for storing access and utilization information, the unique identifier or globally unique identifier code is coded into a bitmap by the logical "or" of the unique identifier code and the corresponding location in the bitmap. By convention, a logical high state is selected to indicate that a particular action has occurred with respect to a particular message. Those skilled in the art will appreciate that it is not necessary to utilize this convention and that other alternatives may be selected as well. Furthermore, as noted above, those skilled in the art will appreciate that conventional database techniques may also be utilized for acquiring and maintaining data pertaining to various events associated with an electronic mail message.

In the preferred exemplary embodiment, as noted above, a bitmap is utilized for the purpose of acquiring and maintaining electronic mail tracking information. Individual bitmaps may be associated with a single event. In the preferred exemplary embodiment, a sequence of binary data bits is utilized. Locations for the data bits or an array of locations may be addressed using the unique identifier referenced above. In the preferred exemplary embodiment, a high logic level for a data bit indicates that a particular action has taken place. Those skilled in the art will appreciate that the selection of the logic level for identifying an event with a particular data bit is a matter of design choice.

The use of the response server for recording events associated with a recipient reading a message is known as "open" tracking. As noted above, the globally unique identifier may include a unique identifier for a particular message list, message and/or recipient. The act of opening/reading a message automatically generates an event in a response server.

In the first preferred exemplary embodiment, the footer of an HTML electronic mail message references an image with a unique identifier or globally unique identifier. As noted above, the globally unique identifier may also include a unique identifier for a particular message list, message and/or recipient. The act of opening the message references the image that then generates an event in a response server.

In accordance with the preferred exemplary embodiment, when this occurs, the image request is initially automatically routed to a response server that receives the identifier information and thereafter automatically returns the requested image. The globally unique identifier information is decoded via the response server to determine the particular electronic mail message list, or message recipient. The event associated with the list and/or message is then recorded and archived. The information is particularly useful for generating large volumes of data pertaining to electronic mail messages in a compact and convenient format.

The use of the response server for recording events associated with a recipient clicking on a link in a message is known as click-through tracking. As noted above, the globally unique identifier may include a unique identifier for a particular message list, message, link and/or recipient. The act of clicking on the link automatically generates an event in the response server and the user is forwarded to the ultimate destination.

In the first preferred exemplary embodiment, the links in the original message are replaced with links that references the response server and include a unique identifier or globally unique identifier. As noted above, the globally unique identifier may also include a unique identifier for a particular message list, message and/or recipient. The act of clicking on a link in the message generates an event in a response server.

In accordance with the preferred exemplary embodiment, when this occurs, the user is initially automatically routed to a response server that receives the identifier information. The globally unique identifier information is decoded via the response server to determine the particular electronic mail message list, original link, and message recipient. The user is thereafter automatically routed to the location of the original link. The event associated with the list and/or message is then recorded and archived. The information is particularly useful for generating large volumes of data pertaining to electronic mail messages in a compact and convenient format.

In the preferred exemplary embodiment a bitmap is utilized to track events, for example, which recipients have opened a particular message. The bitmap is conveniently updated by the logical "or" of the recipient unique identifier that designates a unique position in the bitmap for storage of this information. For example, if recipient No. 100 has opened a message, address or location 100 in the bitmap changes to logic level 1 through this logical operation. As a result, it is very easy to acquire and maintain tracking information for a large group of messages. The total recipient and unique recipient counts are maintained and reported as desired. The bitmap information may then be utilized to identify individual recipients who have opened a particular message. Additionally, the bitmap provides a very convenient mechanism for readily generating statistical information concerning various messages.

One additional feature and advantage of the bitmap techniques described above is that they provide inherent compression advantages over the prior art techniques. For example, the bitmap can be essentially dynamically allocated depending on recipient information. The physical size of the bitmap need only be as large as the highest number address for which unique identifier information has been received. For example, if there are one million recipients for a message, and only unique identifier address designation 10 has been received, then the bitmap size need only be sufficiently large enough to make this designation. The bitmap does not have to be sized to accommodate each of the one million recipients initially.

As another feature and advantage of the present invention and in recognition of the space-saving aspects described above, in accordance with an alternate exemplary embodiment, if the bitmap is less than 1000 bits in size, then the unique identifiers are simply stored. Furthermore, if a bitmap is old or otherwise seldom accessed, then further compression techniques may also be utilized for realizing additional benefits from the elimination of storage requirements. Those skilled in the art will recognize that any lossless technique for data compression may be utilized in order to further minimize the amount of space required for storage of the information.

In the preferred exemplary embodiment, tracking information on recipient message clicks is processed when the information is received for the first five days following message transmission. Thereafter the information is processed into the bitmap when at least 50 unique identifiers have been received and stored in a buffer or the oldest is at least eight hours old. After 15 days, processing is implemented only after 100 events have been received and stored in a temporary buffer or the oldest is at least 24 hours old. Recipient message open information is processed on arrival for the first five days. For up to 30 days information is processed if there are at least 100 events or the oldest is greater than 24 hours old. This results in further optimization of the system because fewer resources are required to process and archive the information.

Yet an additional advantage of the present invention is the inherent performance gains that are achieved through the use of logical operations for implementation of the data storage techniques of the present invention. For example, a processor that has a 32-bit architecture may be able to process 32 simultaneous logical "or" operations in a single clock cycle as compared with one or more cycles required for logical operations and then storage with more conventional approaches.

In accordance with a further alternate exemplary embodiment of the present invention, information pertaining to various actions associated with an electronic mail message is utilized to automatically generate focused electronic mail message lists. In this alternate exemplary embodiment, the unique identifier information or globally unique identifier information is utilized to provide a cross-reference with the recipient's electronic mail address. Electronic mail messaging lists can automatically be generated through utilization of the correlation between the unique identifier information and tracking information from the response server. For example, new electronic mail messaging lists can be generated by identifying those recipients of prior messages who have clicked on a particular link. Those skilled in the art will appreciate that a great variety of other alternative list types may be created through the use of the stored message tracking information described above.

The systems and methods described herein include various innovations and inventions that have been described with respect to a variety of exemplary embodiments. Those skilled in the art will appreciate that the various innovations and inventions disclosed herein may be utilized in conjunction with other technologies or for storing information relating to other applications. Accordingly, the claims set forth below should be construed broadly and not limited to the preferred exemplary embodiments described herein. Those skilled in the art will further appreciate that a variety of substitutions and modifications can be made to the physical structures described herein without departing from the spirit and scope of the claims set forth below.

We claim:

1. A method of monitoring events associated with the transmission of an electronic mail message comprising the steps of:

transmitting electronic mail messages to a plurality of recipients, wherein each of the mail messages has an identifier code contained within the mail message;

directing a recipient of a mail message to an intermediate response server and thereafter creating a link between the recipient and a destination site;

temporarily storing a received identifier code in a buffer;

storing in a bitmap after a predetermined period of time information which provides a correlation between the identifier code and the act of creating the link, including generating the logical "or" of the identifier code and a location in the bitmap; and dynamically sizing the bitmap to be sufficiently large to accommodate the storage of a largest received identifier code.

* * * * *